ABSTRACT

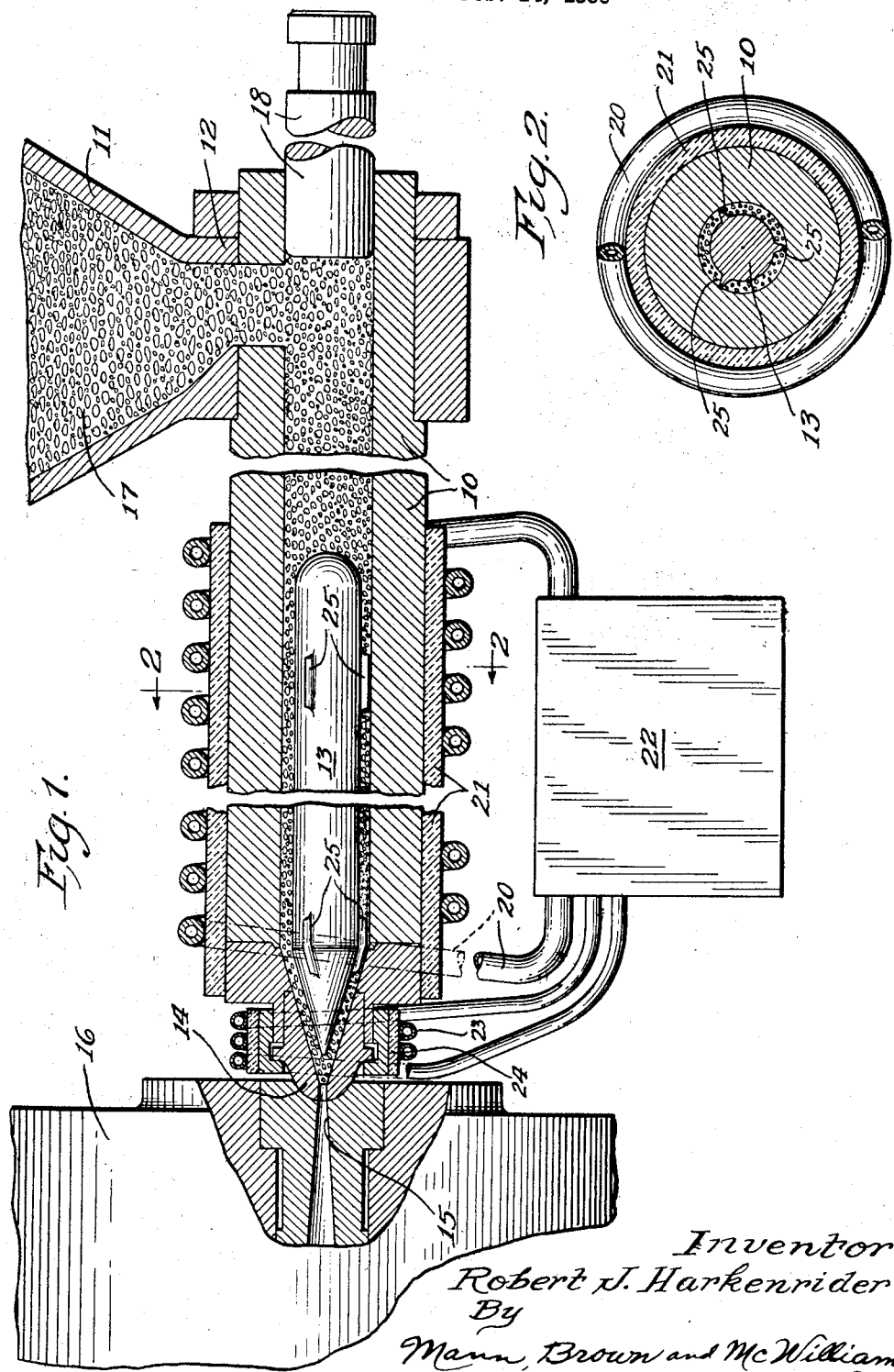

United States Patent Office 2,875,311
Patented Feb. 24, 1959

2,875,311

INDUCTION HEATING IN INJECTION AND EXTRUSION PROCESSES

Robert J. Harkenrider, Winona, Minn.

Application February 14, 1956, Serial No. 565,333

14 Claims. (Cl. 219—10.49)

This invention provides accurate temperature control in injection and extrusion processes and more particularly permits accurate control of the distribution of heat throughout the material being processed.

Accurate heat distribution and temperature control has long been recognized as a primary factor in achieving a high quality and uniform product in injection and extrusion processes but heretofore has never been realized in practice without seriously compromising other aspects of the process.

In the conventional prior art arrangements, the heating chamber which is defined by an outer shell and a core located centrally therein has been heated externally. Usually metallic spacer fins locate the core appropriately in the outer shell and there is some transfer of heat to the core by conduction. Nevertheless, this arrangement results in undesirable localized heat concentrations that adversely affect the properties of the adjacent material and that are relatively ineffective in heating remote regions of the material.

As the material being processed passes through the heating chamber, it is first separated by the spacer fins and when it subsequently reunites flashing develops and impairs the uniformity of the ultimate product. Care must be given to the arrangement of the spacer fins.

According to the present invention, induction heating is employed to secure the desired control of the heat distribution. Broadly speaking, induction heating has been previously suggested for injection and extrusion processes but in these specific applications of the principle the depth of penetration of the heat produced by induction was unduly limited and little, if any, heat was generated internally. This lack of penetration in the prior art applications is due to the so called "skin effect" phenomenon, resulting from the shielding effect of the eddy currents produced. To overcome this, an additional induction coil has been located within the inner core but the necessary electrical conductors for such an arrangement must extend across the heating chamber and in view of the temperature and pressure conditions therein are not only difficult to maintain but their physical size introduces additional undesired flashing conditions.

The principal object of the present invention is to overcome the disadvantages of the prior art heating arrangements and this is accomplished by combining an external induction heating coil with a novel arrangement as respects the relative size, shape, and material of the outer shell and core members that define the heating chamber. In this arrangement regard is had to the structural characteristics which these members must possess to fulfill their usual functions.

Other objects and advantages of the invention will be apparent during the course of the following description.

In the accompanying drawings forming a part of this specification and in which like numerals are employed to designate like parts throughout the same, Fig. 1 is a side sectional view of the important parts of an injection molding machine illustrating the application of induction heating thereto; and Fig. 2 is a cross sectional view taken in the vertical plane of the line 2—2 of Fig. 1.

Referring now to the drawings, the injection machine consists of an outer elongated cylindrical shell 10, a hopper 11 and hopper chute 12 communicating with the outer end of the shell 10, a core or torpedo 13 symmetrically disposed within the heating chamber defined by the shell 10, and a nozzle 14 communicating with a sprue runner 15 formed in the mold member 16.

Granules of any suitable dielectric material capable of being injected into the mold members such as polyvinyl chloride are stored in the hopper 11 and automatically fed into the heating chamber. An injection plunger 18 reciprocates in the heating chamber 10 to force the granules 17 along the heating chamber and past the torpedo 13 for injection through the nozzle 14. While passing through the heating chamber the granules are heated appropriately until they reach the desired state of plasticity.

The particular material being processed determines the optimum operating temperature, heat distribution pattern, state of plasticity, rate of flow, rate of heat generation, and similar factors and the present invention is concerned not with the determination of these optimum conditions but rather with attainment of a predetermined set of conditions by controlling the generation and distribution of heat in the heating chamber.

The desired heating is provided by an induction coil 20 having a plurality of turns telescoped over the heating chamber 10 and insulated therefrom by a cylindrical sleeve 21 of suitable insulating material. The sleeve 21 also provides thermal insulation for the heating chamber. The ends of the coil are connected to a suitable low frequency source of A. C. power as indicated at 22, which for convenience may be 60 cycles per second for supplying heat to the material to be injected. Similarly, an additional induction coil 23 and insulating sleeve 24 may be provided for heating in the region of the nozzle 14 and this coil may also be controlled from the power source 22. The induction coils 20 and 23 are preferably hollow tubes to allow internal water cooling to be employed.

The torpedo is located within the heating chamber and as shown is preferably of the floating type. Thus the torpedo is formed with spacer or spreader fins 25 of minimum size in order to minimize undesired flashing effects such as occur when the plastic material is separated and reunited during its passage through the heating chambers of the prior art arrangements. The fact that the present invention can be used in conjunction with a floating type of torpedo precludes the possibility that the torpedo is heated primarily by conduction and definitely indicates that a substantial amount of heat is actually generated in the torpedo.

While the floating type torpedo is preferred, the invention may be practiced with a torpedo having any desired spreader fin arrangement since the ultimate heat distribution pattern produced by the present invention is determined primarily by the location of the heat generating areas and the size, shape, and arrangement of the conductive fins has little effect on this heat pattern.

It should be expressly understood that while an injection machine is illustrated in the drawings accompanying this specification, the invention is also applicable to extrusion machines which differ from injection devices only in that the core or torpedo is constituted by an axially extending rotating screw. The term core as used herein is intended to cover both injection and extrusion machines.

Generally it is desired to maintain approximately equal temperatures at the outside surface of the torpedo and at the inside surface of the shell 10 as this tends to provide a substantially uniform distribution of heat across the heating chamber. In certain injection and/or extrusion applications, either due to the material being processed, or due to the size and shape of the injection or extrusion apparatus it is desired to maintain certain predetermined temperature differentials between the torpedo and the shell and such differentials are also readily obtainable according to the present invention. More specifically, it is usually desired to maintain the torpedo at a slightly higher temperature than the shell since the torpedo provides a smaller exposed surface in contact with the material being processed.

As previously mentioned, the skin effect phenomenon tends to concentrate the major portion of the induced heating currents in the outer regions and thus tends to heat the outer regions to a greater extent than the inner regions. In low frequency applications (on the order of 60 cycles) this skin effect is not too marked but it nevertheless results in heating the outer regions or shell to a greater extent than the inner regions or core. This skin effect can be substantially avoided by utilizing highly magnetic materials having low electrical conductivity such that heat is generated primarily due to hysteresis effects and in such an arrangement heat is generated at a more uniform rate through the entire cross section of the heating apparatus. This magnetic hysteresis method of heat generation is not satisfactory for injection and extrusion processes since the inner portions or core of the apparatus do not reach as high a temperature as the outer portions or shell and this is in part due to the difficulty in properly proportioning the magnetic flux paths through the core and shell and in part due to the fact that a limited amount of eddy currents and their accompanying skin effect will invariably appear.

In the present invention it is possible to induce somewhat higher temperatures internally than externally by employing a relatively magnetic material for the core and a relatively non-magnetic material for the shell. In addition, the shell material must offer a relatively high electrical resistance while the core material may be of a high or low electrical resistance in accordance with the specific requirements. If the core material is of low electrical resistance, proportionally more heat and a higher temperature will be generated in the core. Similarly, the hysteretic loss characteristic of the magnetic material of the core can be varied in order to additionally vary the temperature of the core without substantially affecting the cylinder.

It has been found that the relative temperatures may be additionally controlled by varying the geometrical relationships between the torpedo size, the shell size and wall thickness, and the spacing between the shell and the torpedo.

Since injection and extrusion processes involve relatively high temperatures and pressures over extended periods of time regard must be had to the structural characteristics of the materials employed as well as to the constancy of these characteristics under the influence of the temperatures and pressures in the heating chambers. Similarly it is desirable that the electrical and magnetic characteristics remain substantially constant.

The influence of all of the foregoing factors will become more apparent from the following chart which lists the size and materials employed in a series of tests which demonstrate the temperature control advantages of the present invention.

In the chart the cylinder or shell 10 has an outside diameter of two inches in every instance. It is preferred that the nozzle 14 and the shell 10 are both formed of the same material since the heating problems are generally similar for both. The core or torpedo 13 is of cold rolled steel and is positioned symmetrically within the cavity formed by the cylinder.

| Shell Material | Shell Wall Thickness | Core Diameter | Core Temp., °F. | Shell Temp., °F. |
|---|---|---|---|---|
| Cold Rolled Steel | 5/8 | 1/2 | 160 | 180 |
| Do | 5/8 | 1 | 175 | 190 |
| Do | 1/8 | 1 1/2 | 150 | 190 |
| Stainless Steel [1] | 5/8 | 1/2 | 260 | 220 |
| Do | 5/8 | 1 | 240 | 210 |
| Do | 3/8 | 1 | 260 | 230 |
| Do | 3/8 | 1 | 280 | 250 |
| Do | 1/8 | 1 1/2 | 195 | 180 |
| Hastelloy B [2] | 3/8 | 1 | 180 | 140 |
| Do | 3/8 | 1 | 220 | 180 |
| Ampco #18 [3] | 3/8 | 1 | 130 | 180 |
| Do | 3/8 | 1 | 185 | 230 |
| Aluminum | 3/8 | 1 | 215 | 300 |

[1] Stainless steel employed in these tests was non-magnetic.
[2] Hastelloy B consists of a maximum of 33 percent molybdenum and 7 percent iron, and the balance is nickel. Hastelloy B is relatively non-magnetic and a relatively poor electrical conductor.
[3] Ampco #18 consists of 84.6 percent copper, 11.3 percent aluminum, 3.7 percent iron, and 0.4 percent of special agents. Ampco #18 is relatively non-magnetic but is a good electrical conductor.

Many of the teachings of the present invention are embodied in the foregoing chart though this specific disclosure should not be construed to limit the rather broad general character of the invention.

It should first be noted that when both the shell and the core are formed of cold rolled steel, a rather strongly magnetic material and a material having significant electrical resistance, it is found that the temperature of the shell exceeds the core temperature to such an extent as to render this combination of materials ineffective for use in injection or extrusion processes dealing with plastic and similar dielectric materials as described previously.

However, when the shell is formed of a non-magnetic stainless steel material, the temperature differential between the shell and torpedo is reversed and this general relationship offers a more ideal heat distribution pattern.

Hastelloy B was also employed for the shell material, and since it is non-magnetic and of relatively high electrical resistance, it makes it possible to generate higher temperatures for the core than for the shell.

Ampco #18 and aluminum are both non-magnetic; however, they are good electrical conductors and when employed for the shell develop strong eddy currents which due to the accompanying skin effect phenomenon, seriously limit the heating of the core.

The foregoing bears out in a general way the manner in which the temperature relationship between the shell and core may be varied by varying the materials employed. In each case, cold rolled steel was used for the core and if a material of similar magnetic properties, but of different electrical properties or of different hysteretic loss characteristics, were employed for the core, its temperature could be controlled accordingly somewhat independently of the shell temperature.

It should also be noted that the data from the above chart was taken with an annular air gap between the shell and torpedo of a thickness of 1/8 inch. It can be seen that the smaller diameter cores result in a greater core temperature. Other things being equal, the smaller diameter cores present a smaller mass and hence a lower overall heat capacity. The use of a hollow core even further reduces its overall heat capacity. It can also be shown that as the air gap is successively diminished, the heating of the torpedo relative to the shell becomes even more pronounced.

To more clearly demonstrate the rather specific control over the heat distribution pattern which is permitted by the present invention, a series of tests using materials for the shell of progressively decreasing magnetic characteristics and increasing electrical resistance characteristics and using the relatively magnetic cold rolled steel for the core, were also performed. In this series of tests, a cylinder having an outer diameter of two inches and a wall thickness of 7/16 inch and a core having a diameter of one inch were employed.

To provide the desired variations in magnetic and electrical characteristics, steel alloyed with varying percentages of nickel was employed for the shell. The first test used cold rolled steel for the cylinder and a temperature differential of 20 degrees F. in favor of the shell resulted. In the second test, a steel having 1.83 percent nickel alloy was used for the shell and the temperature differential in favor of the cylinder was only 15 degrees F. In a third test, the shell material consisted of steel alloyed with 3.45 percent nickel and the temperature differential in favor of the shell was decreased to 8 degrees F. In still another test, the steel was alloyed with 6 to 8 percent nickel and the temperature differential rose to 30 degrees F. in favor of the core.

Thus the use with steel of progressively increasing amounts of nickel is one proven method for closely regulating the temperature differential between the cylinder and the torpedo. It will be apparent that many other combinations of materials may be employed to obtain similar controls of the temperature.

It will be noted that the temperature ranges disclosed herein do not exceed the magnetic transformation points for the materials employed and it is of prime importance that the core material be chosen such that its magnetic transformation point need not be exceeded. The usual injection and extrusion processes require no more than 500° F. for the heating chamber and there are many magnetic materials that may be employed for the core that have magnetic transformation points well in excess of 500° F.

In its broadest aspect, the invention teaches that, by employing a core material exhibiting a greater heat generating characteristic than the shell material, it is possible to achieve higher temperatures in the core than in the shell. In accomplishing this, it is important that the shielding effect of the shell eddy currents does not completely or substantially obscure the presence of the core. While the use of a magnetic core material has been disclosed as the preferred form, it is an additional concept of the invention that even with a non-magnetic shell and core, it is possible to generate a higher core temperature if the heat generating characteristic of the core is sufficiently greater than the heat generating characteristic of the shell. When dealing with non-magnetic materials the heat generating characteristic is directly related to the electrical conductivity of the materials. If necessary, the overall heat capacity of the core may be reduced sufficiently to further increase the core temperature.

To verify the foregoing, tests were made employing an aluminum core having a diameter of one inch and a steel cylinder having an outer diameter of two inches and a three-eighths inch wall thickness. These tests showed that with 1018 steel for the cylinder, the cylinder reached a temperature of 164° F. while the core was only 153° F. However, when an 18–8 stainless steel was used for the cylinder, the cylinder reached 185° F. and the core reached 190° F. Thus the increased resistance of the 18–8 stainless steel permitted the core to develop a higher temperature than the cylinder.

It should be understood that the description of the preferred form of the invention is for the purpose of complying with section 112, title 35, of the U. S. Code and that the appended claims should be construed as broadly as the prior art will permit.

I claim:

1. In apparatus for molding dielectric material, an outer shell, a core disposed therein and defining therewith an annular heating chamber for the dielectric material, said core and shell consisting of metallic material with the core material being relatively magnetic and the shell material being relatively non-magnetic and a relatively poor electrical conductor, and a low frequency current carrying coil encircling the outer shell in the region of said core for generating heat by induction in both the core material and the shell material.

2. In apparatus for molding dielectric material, a lengthwise extending outer shell symmetrical about its longitudinal axis, a lengthwise extending core symmetrical about its longitudinal axis and disposed symmetrically in said shell and defining therewith a lengthwise extending annular heating chamber for the dielectric material, said core and shell consisting of metallic material with the core material being relatively magnetic and the shell material being relativey non-magnetic and a relatively poor electrical conductor, and a lower frequency current carrying coil encircling the outer shell in the region of said core for generating heat by induction in both the core material and the shell material.

3. In apparatus for molding dielectric material, a lengthwise extending outer shell symmetrical about its longitudinal axis, a lengthwise extending core symmetrical about its longitudinal axis and disposed symmetrically in said shell and defining therewith a lengthwise extending annular heating chamber for the dielectric material, said core being formed of cold rolled steel and being relatively magnetic and said shell being formed of a relatively nonmagnetic alloy of steel that is a relatively poor electrical conductor, and a low frequency current carrying coil encircling the outer shell in the region of said core.

4. In apparatus for molding dielectric material, a lengthwise extending outer shell symmetrical about its longitudinal axis, a lengthwise extending core symmetrical about its longitudinal axis and disposed symmetrically in said shell and defining therewith a lengthwise extending annular heating chamber for the dielectric material, said core being formed of cold rolled steel and being relatively magnetic and said shell being formed of a nickel alloy of steel that is relativey non-magnetic and a poor electrical conductor, and a low frequency current carrying coil encircling the outer shell in the region of said core.

5. The method of applying induction heating to molding apparatus consisting of a metallic outer shell and a metallic core disposed therein and defining therewith an annular heating chamber for dielectric material; said method comprising employing a relatively magnetic material for said core and a relatively non-magnetic and relatively poor electrically conducting material for said shell, and generating a low-frequency alternating current in a path in external surrounding relation to said shell to subject said apparatus to a low frequency electromagnetic field and generate heat by induction in both the core and the shell.

6. The method of controlling the heat distribution pattern in molding equipment consisting of a metallic outer shell, said shell being of a material that is relatively non-magnetic and a relatively poor electrical conductor, a metallic core disposed therein and defining therewith an annular heating chamber for dielectric material, said core being of a material that is relatively magnetic, and a low frequency alternating current carrying coil encircling the outer shell in the region of said core; said method comprising replacing said core with a core of similar material having cross-sectional dimensions that are a given amount smaller than the cross-sectional dimensions of the original core, and replacing the shell with a shell of similar material and having cross-sectional dimensions said given amount smaller than said replaced core to maintain a constant clearance dimension between the core and shell while decreasing the size of each and thereby raising the core temperature relative to the shell temperature in said equipment.

7. In apparatus for molding dielectric material, an outer shell, a core disposed therein and defining therewith an annular heating chamber for the dielectric material, said core and shell consisting of metallic material with the core material having a greater heat generating characteristic in the presence of an alternating electromagnetic field than the shell material and the shell being relatively non-magnetic and a relatively poor electrical conductor, and a current carrying coil encircling the outer shell in the region of said core.

8. In apparatus for molding dielectric material, an outer shell, a core disposed therein and defining therewith an annular heating chamber for the dielectric material, said core and shell consisting of metallic material with the core material having a greater heat generating characteristic in the presence of an alternating electromagnetic field than the shell material and the shell being relatively non-magnetic and a relatively poor electrical conductor, and a low frequency current carrying coil encircling the outer shell in the region of said core.

9. In apparatus for molding dielectric material, a lengthwise-extending outer shell, a lengthwise-extending core disposed therein, said core having an outside diameter slightly less than the inside diameter of the surrounding shell portion to define a lengthwise-extending annular flow passage for the dielectric material, said core being formed of a relatively magnetic material and said shell being formed of a relatively non-magnetic material of low electrical conductivity, and a low-frequency current-carrying coil encircling the shell in the region of said core to generate heat in both the core material and the shell material and drive the outer surface of the core to a higher temperature than the inner surface of the shell.

10. In apparatus for molding dielectric material, a lengthwise-extending outer shell, a lengthwise-extending core disposed therein, said core having an outside diameter slightly less than the inside diameter of the surrounding shell portion to define a lengthwise-extending annular flow passage for the dielectric material, and a low-frequency current-carrying coil encircling the shell in the region of said core to set up, lengthwise through the shell and core, a low-frequency alternating electromagnetic field, the core material and shell material each having heat-generating characteristics in the presence of the alternating electromagnetic field, such that heat is generated simultaneously in both the core and shell to drive the outside surface of the core to its ultimate temperature substantially simultaneously with the inside surface of the shell.

11. In apparatus for molding dielectric material, a lengthwise-extending outer shell, a lengthwise-extending core disposed therein, said core having an outside diameter slightly less than the inside diameter of the surrounding shell portion to define a lengthwise-extending annular flow passage for the dielectric material, and a low-frequency current-carrying coil encircling the shell in the region of said core to set up, lengthwise through the shell and core, a low-frequency alternating electromagnetic field, the core having greater heat-generating characteristics in the presence of the alternating electromagnetic field than does the shell to drive the outside surface of the core to a higher ultimate temperature than the inside surface of the shell.

12. In apparatus for molding dielectric material, the combination of a lengthwise-extending outer metallic shell, a lengthwise-extending metallic core disposed therein, said core having an outside diameter slightly less than the inside diameter of the surrounding shell portion to define a lengthwise-extending annular flow passage for the dielectric material, and means entirely external of said annular passage for maintaining the outside surface of said core to a higher temperature than the inside surface of said shell, said means including a low-frequency current-carrying coil encircling the shell in the region of said core and in direct heat-generating relation with both said core and said shell.

13. In apparatus for molding dielectric material, a lengthwise-extending outer shell, a lengthwise-extending core disposed therein, said core having an outside diameter slightly less than the inside diameter of the surrounding shell portion to define an annular passage for the dielectric material, and a low-frequency current-carrying coil encircling the shell in the region of said core to set up, lengthwise through the core, a low-frequency alternating electromagnetic field, the core being a metallic material of relatively high electrical conductivity and the shell being a metallic material of relatively low electrical conductivity, such that heat is generated simultaneously in both the core and shell to cause the outside surface of the core to reach an ultimate temperature at least equal to the ultimate temperature of the inside surface of the shell.

14. In apparatus for molding a dielectric material, a lengthwise-extending outer shell, a lengthwise-extending torpedo disposed within said shell, said torpedo having an outside diameter slightly less than the inside diameter of the surrounding shell portion and carrying lengthwise-extending spreader fins spaced about its periphery, said fins engaging said shell to position said torpedo symmetrically therein and define a lengthwise-extending annular passage for the dielectric material, said torpedo being formed of a relatively magnetic material and said shell being formed of a relatively non-magnetic material of low electrical conductivity and a low-frequency current-carrying coil encircling the shell in the region of said torpedo to generate heat simultaneously within the torpedo material and the shell material and drive the outer surface of the torpedo to a higher temperature than the inner surface of the shell.

References Cited in the file of this patent

UNITED STATES PATENTS

| | | |
|---|---|---|
| 2,226,447 | Smith et al. | Dec. 24, 1940 |
| 2,226,448 | Smith | Dec. 24, 1940 |
| 2,381,866 | Crosby | Aug. 14, 1945 |